D. W. JEWELL.
PROSPECTOR'S NEEDLE.
APPLICATION FILED JAN. 12, 1910.
961,298.
Patented June 14, 1910.
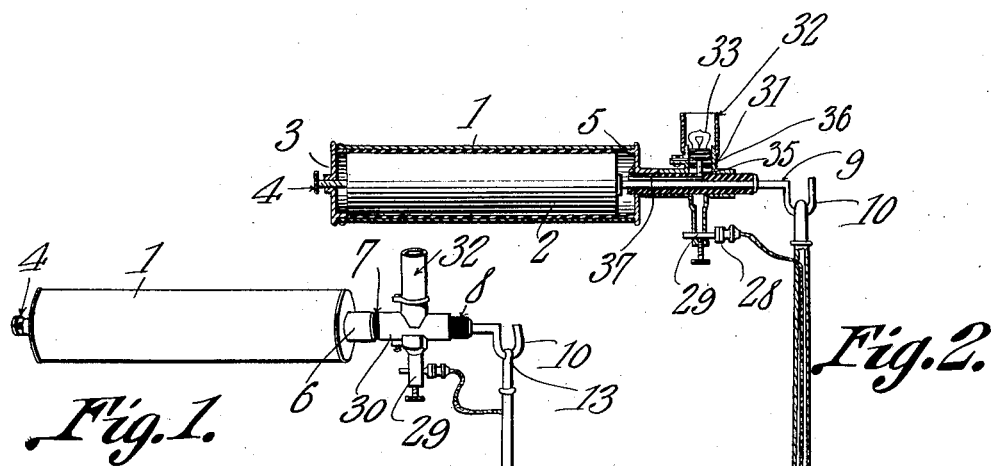
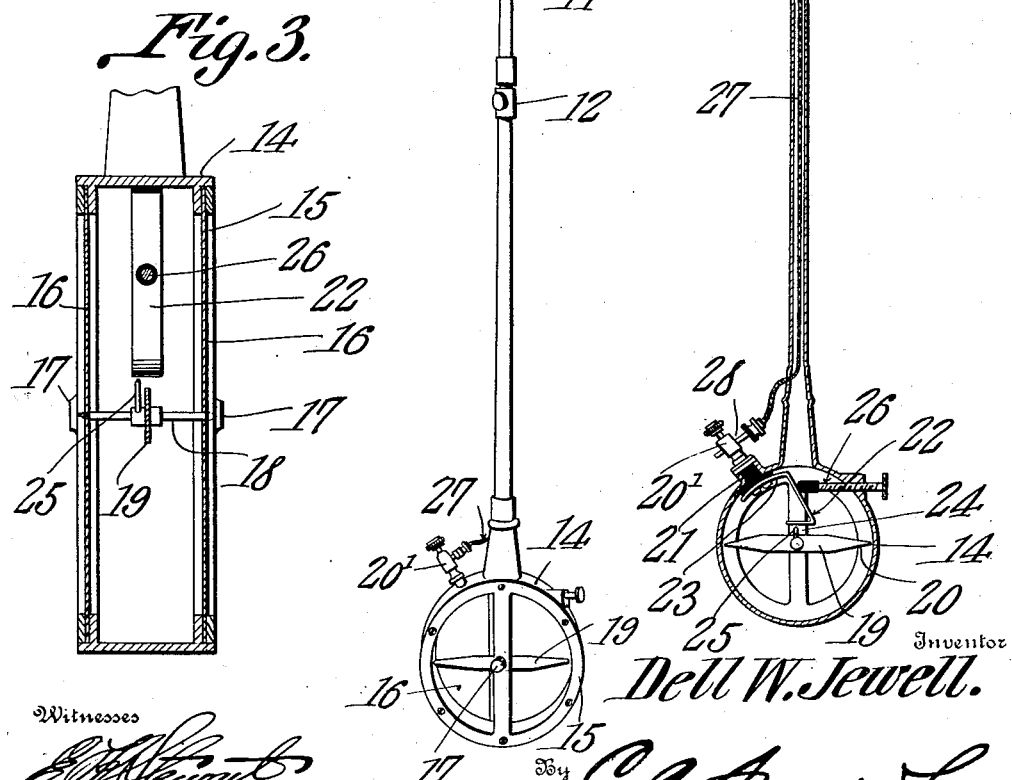

UNITED STATES PATENT OFFICE.

DELL W. JEWELL, OF KALAMAZOO, MICHIGAN.

PROSPECTOR'S NEEDLE.

961,298.  Specification of Letters Patent.  Patented June 14, 1910.

Application filed January 12, 1910. Serial No. 537,727.

*To all whom it may concern:*

Be it known that I, DELL W. JEWELL, a citizen of the United States, residing at Kalamazoo, in the county of Kalamazoo and State of Michigan, have invented a new and useful Prospector's Needle, of which the following is a specification.

This invention relates to devices for locating mineral deposits and has for its primary object to provide an improved instrument by means of which prospectors may seek for mines secretly by night as well as by day.

A further object is to provide an instrument which will have its delicately adjusted indicating mechanism protected from the injurious effects of wind, rain and sand.

A still further object is to provide a simple, strong and durable instrument which may be taken apart when not in use and conveniently carried in the pocket.

To attain these ends, my invention consists of certain novel details of construction and combination of parts which will be hereinafter more fully described and claimed.

In the drawings;—Figure 1 is a view in perspective of the device embodying the present invention; Fig. 2 is a vertical sectional view therethrough; and Fig. 3 is a vertical transverse sectional view in detail.

Referring now to the drawing, the instrument is seen to consist of a cylindrical casing 1 containing a dry battery cell 2. One of the ends of the casing 1 is closed by a removable cap 3 through which is centrally engaged an adjusting screw 4, the inner extremity of which snugly engages the opposed outer zinc wall of the cell 2 and serves to maintain an effective electric connection between the casing and the zinc wall of the battery. The opposite end of the casing is closed by a removable cap 5 which is provided with a centrally located nipple 6 through which a tubular insulator 7 is snugly fitted.

The tubular insulator 7 may be made of fiber, vulcanite, glass or other suitable insulating material and projects considerably beyond the outer end of the nipple 6, as shown at 8. Snugly fitted in the insulator 8 is an arm 9, the inner end of which is held in abutting contact with the carbon pole of the battery, and the outer end of which terminates in a hook 10. It is evident that the casing 1 is in electrical contact with one pole of the battery and the metallic arm 9 is in electrical contact with the other pole of the battery.

Depending from the hook 10 is a tubular stem 11 which is provided intermediate its ends with any suitable joint 12 by means of which the stem may be taken apart so as to be conveniently carried in the pocket when not in use. One end of the stem terminates in an eye 13 which loosely engages the hook 9 so that the stem is capable of a pendulum-like movement when in operative position.

Secured in any preferred manner to the free end of the stem 11 is a circular casing 14 having its circular side walls 15 cut away and the openings closed by windows through which the indicating mechanism contained in the casing may be viewed.

Formed in the side walls 15 of the casing are alined journals 17 receiving the extremities of an arbor 18 upon which is secured in any suitable manner a needle 19. The needle 19 is preferably formed of steel and is magnetized. The needle is so balanced in the casing as to maintain a horizontal position when the stem 11 is in a vertical position. When the casing is brought into close proximity to any mineral deposit containing magnetic ores, the end 20 of the needle will be drawn in the direction of the deposit, this deflection of the needle from its normal position operating to close an electric circuit and cause an electric light to glow to indicate such proximity to magnetic ores, as will presently appear.

A set screw 20 is engaged through the circular wall of the casing and is insulated therefrom by an insulator 21, as shown. A contact plate 22 is provided at one end with an arm 23 which is snugly engaged between the inner face of the insulator and retaining nut of the set screw so as to be in electrical contact with the set screw, and at the other end is provided with an arm 24 which is bent at an angle to the body of the plate so as to be normally maintained in a horizontal position.

A brush 25 projects upwardly from the arbor of the balanced needle and is of such length as to be normally spaced from the bottom face of the contact plate, but adapted to be impinged against said face when the needle is deflected by magnetic ores. A rubber tipped set screw 26 is threaded through the casing and bears against the contact plate whereby the foot of the latter may be forced nearer to the brush so that a minute deflection of the needle will cause the brush to engage the contact plate.

Disposed in the bore of the tube 11 is a flexible insulated wire 27 provided at its ends with plugs 28, one of which is engaged in the set screw 20, and the other in a set screw 29 equipped with a metal sleeve 30 which snugly fits the before mentioned insulator 7.

The sleeve is formed with a nipple 31 which is provided with external screw threads to engage the internal screw threads of a tube 32 which forms a housing for a miniature incandescent lamp 33. The lamp is threaded in a metal socket which forms one pole of the lamp and is rigidly secured by means of a screw or like connector 34 to the nipple 31. A pin 35 is mounted in the bore of the nipple and is insulated from the walls thereof, as shown at 36. One end of the pin is in abutting contact with the other pole of the lamp and the other end of the pin is in abutting contact with a wire 37 which leads back through the insulator 7 and is terminally connected to the casing 1.

It is now evident that when the brush 25 and contact plate 22 are in engagement, the circuit will be closed so that the current will flow from the carbon pole of the battery cell through the rod 9, stem 11, needle 19, flexible wire 27, sleeve 30, lamp 32, pin 35, and return through the wire 1 and set screw 4 to the zinc pole of the battery cell. In operation the casing 1 is held by the operator in a horizontal position and the stem 11 actuated so that the casing 14 begins a slight swinging movement. The operator walks slowly along over the territory suspected to contain magnetic minerals until the light begins to glow which will indicate the presence of magnetic ores.

From the foregoing description, taken in connection with the accompanying drawing, it is thought that the construction and operation of my invention will be easily understood without a more extended explanation, it being understood that various changes may be made in the form, proportion and minor details of construction without sacrificing any of the advantages or departing from the spirit of the invention.

What is claimed is:

1. An instrument of the class described comprising a portable electric battery having a forwardly extending arm, a stem depending from said arm capable of a free swinging movement, a casing at the free end of said stem, said arm, stem and casing being connected to one pole of said battery, an insulated contact plate in said casing connected to the other pole of the battery, a balanced needle in said casing connected in circuit with the casing and arranged to be normally out of contact with the contact plate but capable of being deflected when in proximity to magnetic minerals to engage the contact plate and close the circuit, and an electric light in the circuit adapted to glow when the circuit is closed.

2. An instrument of the class described consisting of a portable electric battery, a pendulum-like stem assembled with said battery, a casing at the free end of said stem, a balanced magnetic needle in the casing adapted to be deflected from its normal position by magnetic minerals, said stem, casing and needle being connected to one pole of said battery, an insulated contact plate in said casing connected to the other pole of said battery, a brush upon the needle arbor normally out of contact with said plate but adapted to engage the same whereby to close the circuit when the needle is deflected, and an electric light in the circuit adapted to glow when the circuit is closed.

In testimony that I claim the foregoing as my own, I have hereto affixed my signature in the presence of two witnesses.

DELL W. JEWELL.

Witnesses:
 AUG. STROBERG,
 A. H. BERRY.